United States Patent [19]

Nichol

[11] Patent Number: 4,675,539

[45] Date of Patent: Jun. 23, 1987

[54] BACKUP POWER SYSTEM

[75] Inventor: James Nichol, Walpole, Mass.

[73] Assignee: Codex Corporation, Mansfield, Mass.

[21] Appl. No.: 776,847

[22] Filed: Sep. 17, 1985

[51] Int. Cl.[4] .............................................. H02J 9/00
[52] U.S. Cl. ........................................ 307/65; 307/43
[58] Field of Search ........................ 307/64, 65, 66, 44, 307/80, 86, 43, 45, 46, 48, 18, 23, 25, 29, 85

[56] References Cited

U.S. PATENT DOCUMENTS

| | | | |
|---|---|---|---|
| 3,654,484 | 4/1972 | Jorgenson et al. | 307/149 |
| 4,044,268 | 9/1977 | Hammel et al. | 307/66 |
| 4,181,842 | 1/1980 | Elias et al. | 307/66 |
| 4,313,060 | 1/1982 | Fickenscher et al. | 307/66 |
| 4,323,788 | 4/1982 | Smith | 307/66 |
| 4,355,240 | 10/1982 | Hamilton | 307/44 |
| 4,447,841 | 5/1984 | Kent | 361/18 |
| 4,482,815 | 11/1984 | Orengo | 307/44 |
| 4,492,876 | 1/1985 | Colbert et al. | 307/66 |
| 4,539,487 | 9/1985 | Ishii | 307/64 X |

FOREIGN PATENT DOCUMENTS

| | | | |
|---|---|---|---|
| 0402988 | 3/1974 | U.S.S.R. | 307/65 |
| 0584390 | 12/1977 | U.S.S.R. | 307/65 |

Primary Examiner—William M. Shoop, Jr.
Assistant Examiner—Sharon D. Logan

[57] ABSTRACT

Backup power is provided for primary power supplies that serve several loads by providing fewer backup power supplies than the number of primary power supplies, generating power fault information indicative of the failure status of the primary power supplies, and connecting the backup power supplies each in parallel to one of the failed primary power supplies in response to power fault signals.

10 Claims, 4 Drawing Figures

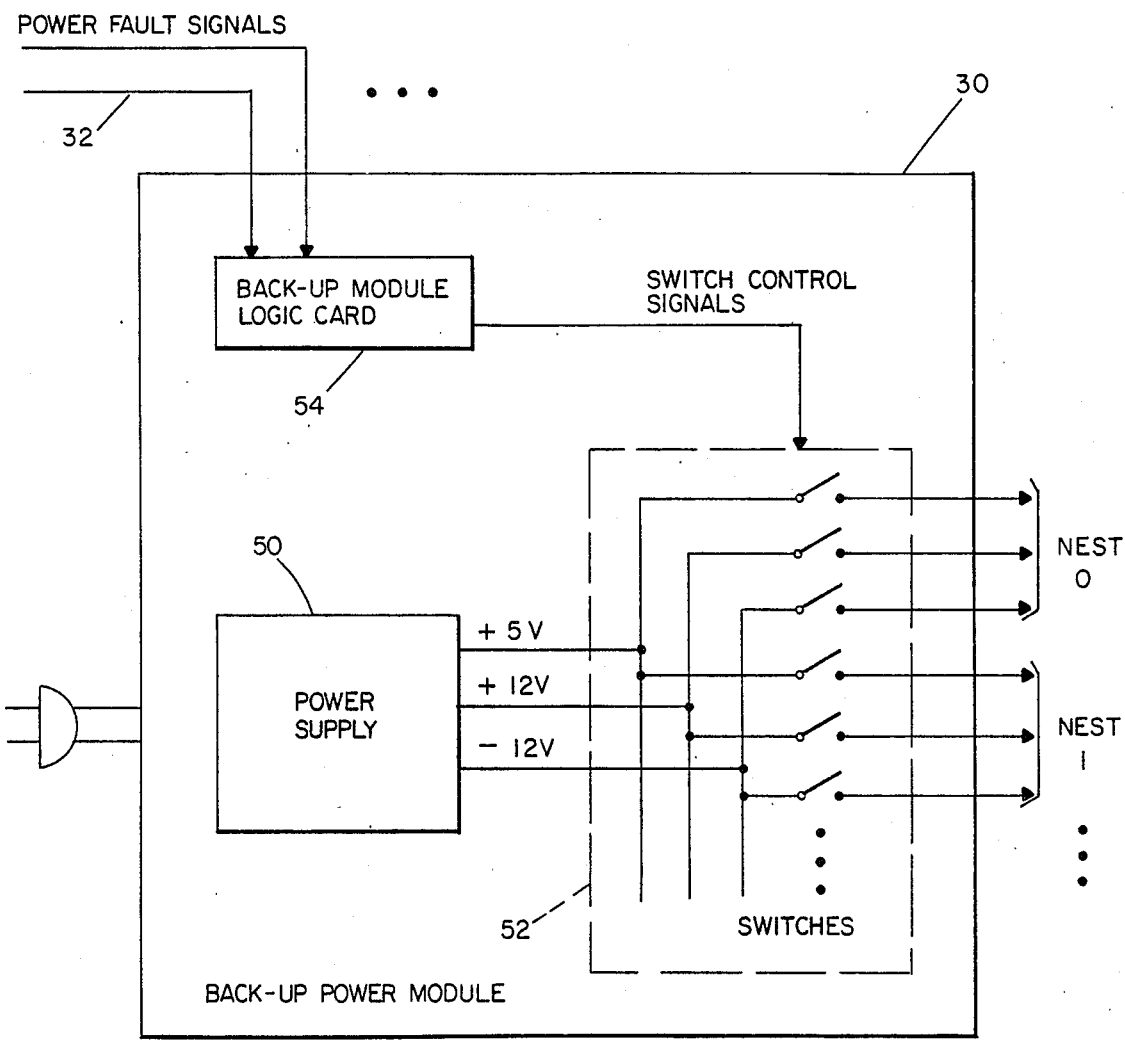

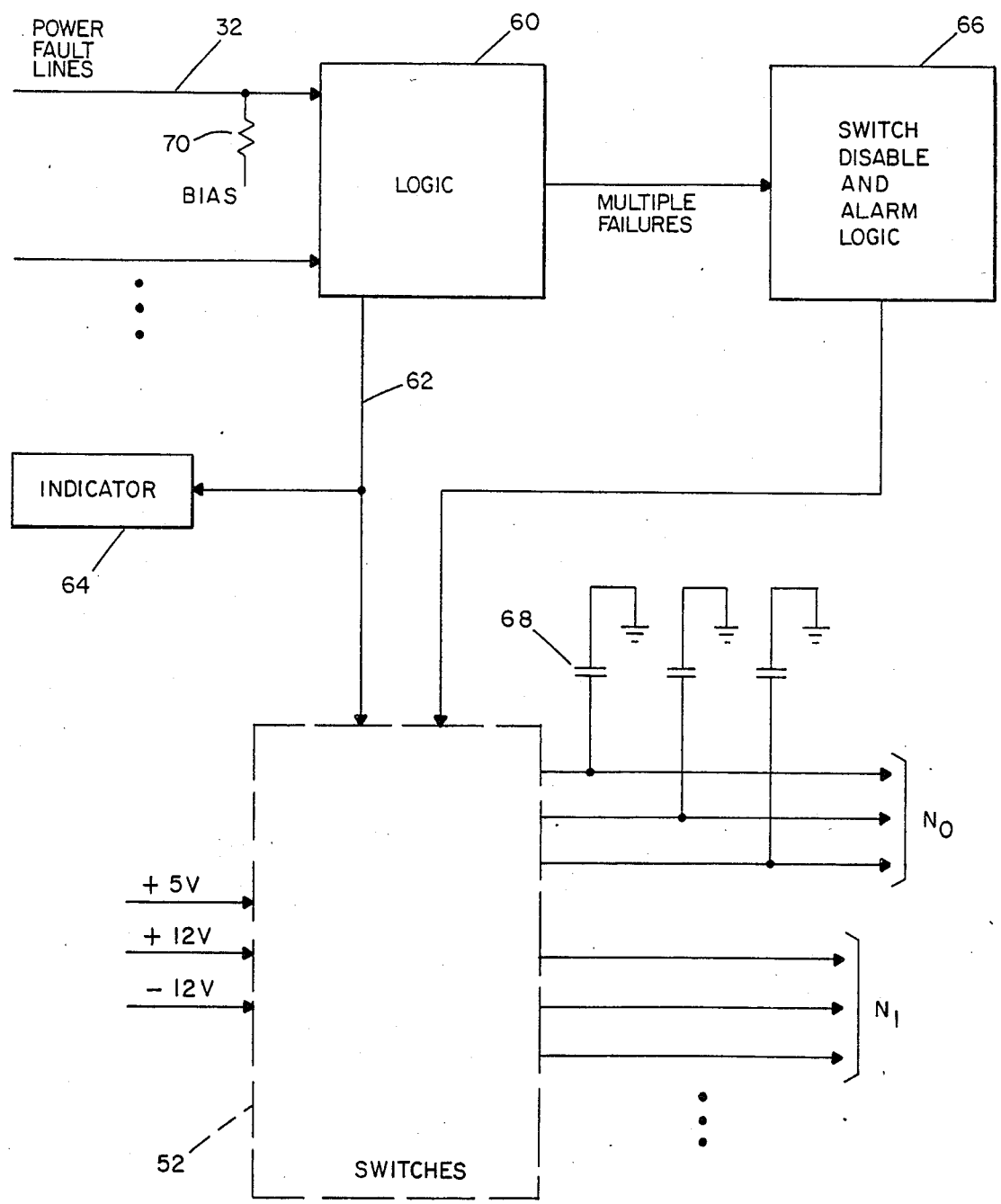

BACKUP POWER SYSTEM

BACKGROUND OF THE INVENTION

The invention relates to providing backup power to primary power supplies each serving one of several loads.

When several loads, e.g., printed circuit cards, require power, it is sometimes cheaper to provide a separate smaller power supply for each load, rather than one large power supply to serve all loads. In cases where it is crucial to avoid an interruption of power to any of the loads, each primary power supply typically has its own redundant backup power supply. In some cases, the backup and primary supplies are constantly connected in parallel. In other cases, the backup supply is switched in only when the primary supply voltage falls too low.

SUMMARY OF THE INVENTION

A general feature of the invention is in providing a backup power supply to serve a plurality of primary power supplies, generating power fault information indicative of the failure status of the primary power supplies, and connecting the backup power supply to the load served by a failed one of the plurality of primary power supplies in response to the power fault information.

Preferred embodiments of the invention include the following features. One backup power supply serves all primary power supplies, minimizing the cost of providing back-up power. The output of each primary power supply is compared with a threshold, and based on the comparisons, the power fault information indicates which primary power supplies have failed. If the output is above another threshold, the output is shunted to ground to protect the load and to automatically trigger the power fault signal. The power fault information is carried on a link by biasing the link to a first logical value, the link being driven to have another logical value when a failure is detected and the link is driven to the other logical value by an open collector transistor; then when a power supply is disconnected for repair, the backup supply is automatically switched in. Each primary supply is isolated from its load by a diode which is connected to block current flow toward the primary supply, the back-up supply being connected on the other side of the diode from the primary supply; the grounding of a failed power supply therefore will not harm the switched in backup supply. The link includes a logical signal line from an output voltage detector associated with each primary power supply, each line carrying a power fault signal when the associated primary power supply fails, and logical circuitry is connected to the lines to trigger an alarm when the number of failed primary power supplies exceeds the number of backup power supplies. There is only one backup power supply. Each load is a nest of circuit boards and each power supply provides DC current to its associated nest.

As a result, backup power can be provided to at least some of the primary supplies using a relatively smaller number of backup supplies. A backup supply is switched in and out automatically when a primary power supply is disconnected from and reconnected to its load. A primary power supply that begins to exceed an acceptable voltage is shunted to ground without affecting its replacement backup supply.

Other advantages and features will become apparent from the following description of the preferred embodiment, and from the claims.

DESCRIPTION OF THE PREFERRED EMBODIMENT

We first briefly describe the drawings.

DRAWINGS

FIG. 3 is a block diagram of a back-up power module.

FIG. 4 is a block diagram of portions of the back-up power module.

STRUCTURE

Figure 1:
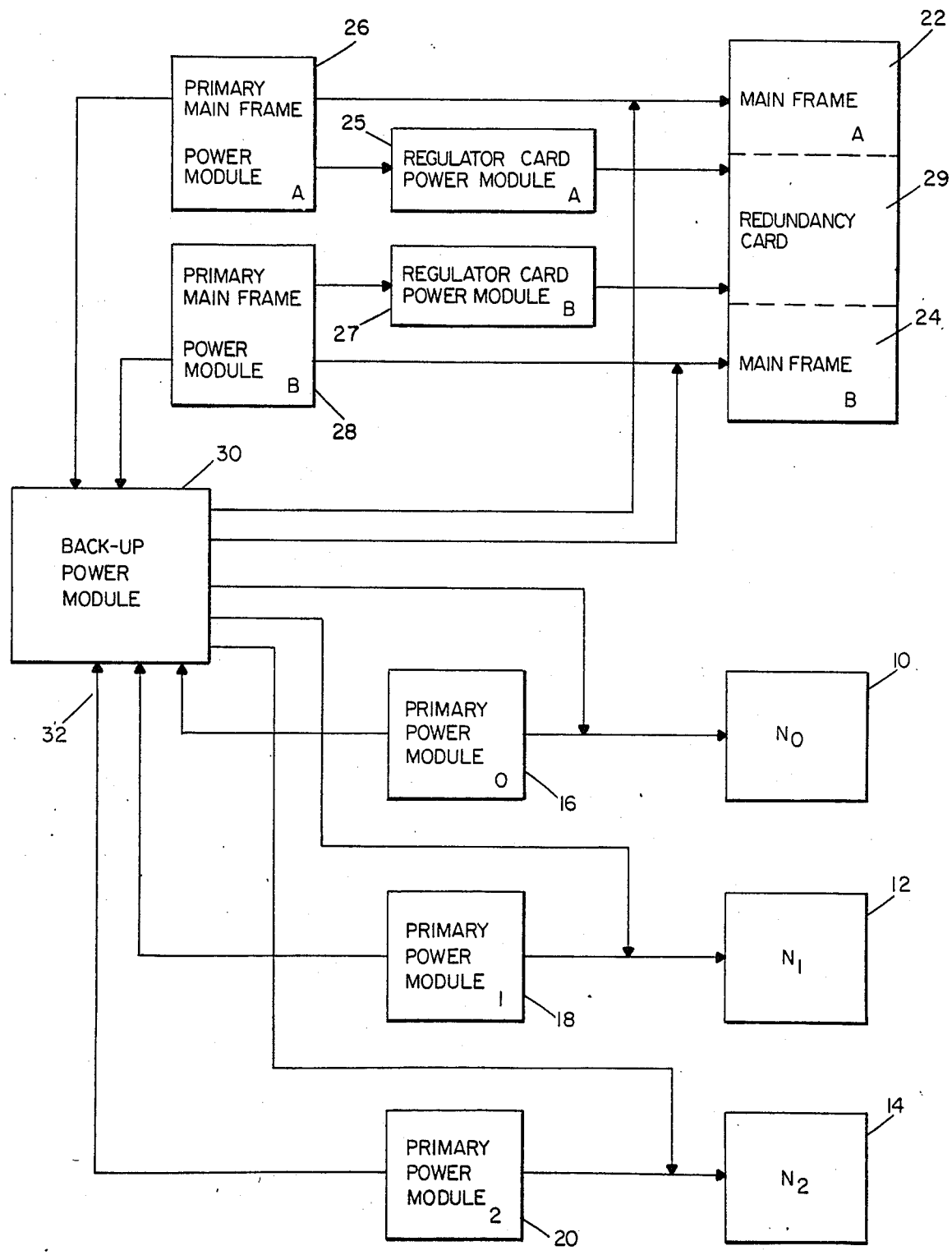
FIG. 1 is a block diagram of a system of loads and power supplies.

Referring to FIG. 1, a set of nests (loads) 10, 12, 14 (each comprising several circuit boards) are powered respectively by primary power modules 16, 18, 20. A pair of redundant main frames 22, 24 and their associated power regulator cards 25, 27 (which are connected to main frame redundancy card 29) similarly are powered respectively by primary main frame power modules 26, 28.

A single back-up power module 30 is provided to power any one of the loads (i.e., one of the nests or main frames) whose associated primary power module fails. Failure of a primary power module is indicated by a power fault signal carried on a line 32 that connects the primary module to the back-up module.

Figure 2:
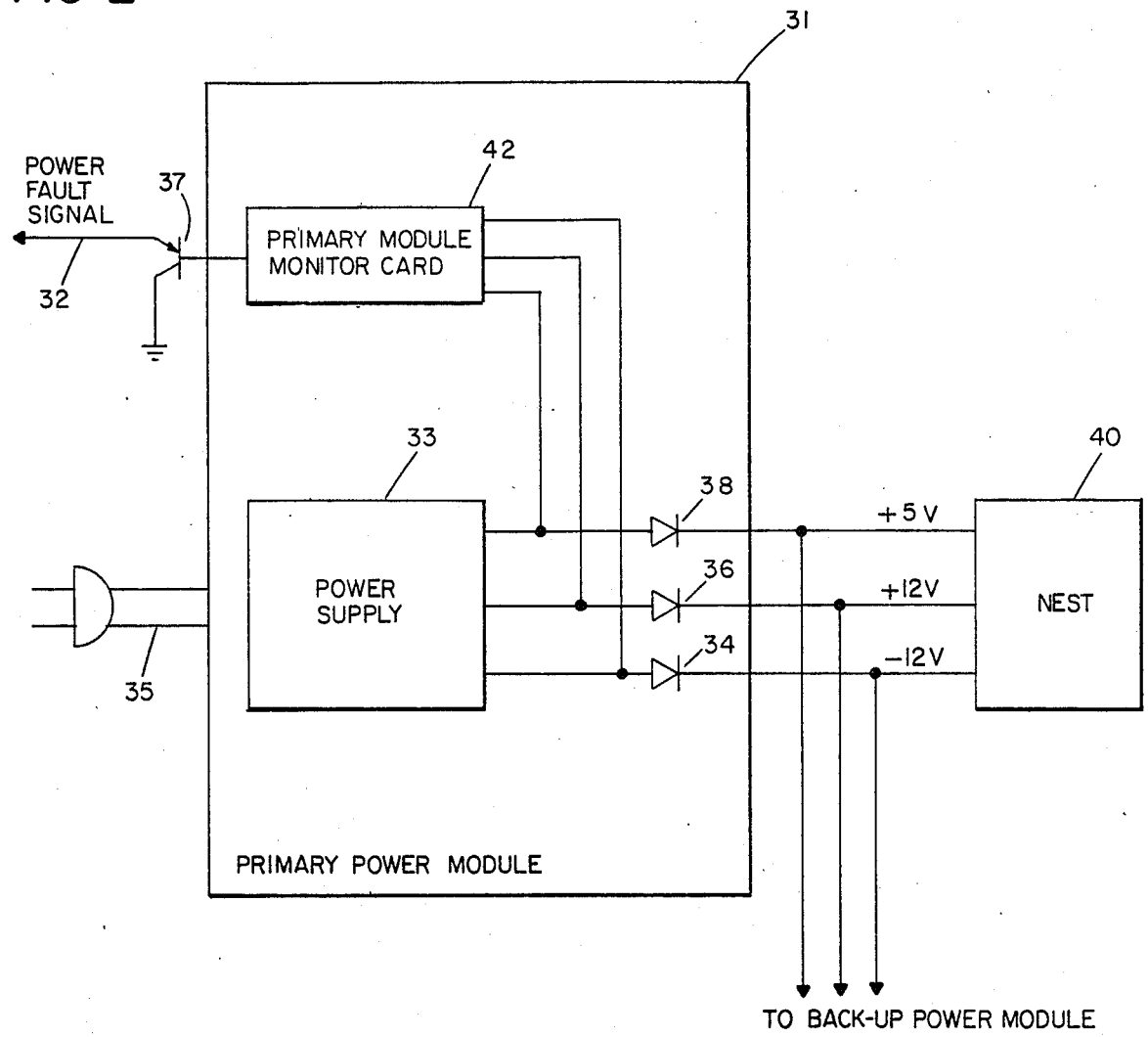
FIG. 2 is a block diagram of a representative primary power module serving one load.

Referring to FIG. 2, a primary power module 31 includes a power supply 33 that converts AC line current 35 to three levels of DC voltage (±5, ±12, and −12) which are supplied respectively via three isolation diodes 34, 36, 38 to nest 40. Module 31 also includes a primary module monitor card 42 that is connected to sense the voltage levels on the three outputs of supply 33, and to provide a power fault signal on line 32 when the voltage level on any of the outputs of supply 33 deviates from an acceptable range.

When the voltage on any of the outputs of supply 33 falls below a low threshold (i.e., 4.6 volts for the 5 volt output or ±9.0 volts for the ±12 volt outputs), the power fault signal is sent. When the voltage on any of the outputs of supply 33 rises above a high threshold (i.e., 6.5 volts for the 5 volt output, or ±14.0 volts for the 12 volt outputs), the outputs of power supply 33 are shorted to ground by card 42. The shorting of those outputs in turn of course triggers the low threshold power fault signal.

Referring to FIG. 3, back-up power module 30 includes a power supply 50 whose three outputs (±5, ±12, −12 volts) are connectable via a bank of switches 52 to any one of the loads. Which load is connected to supply 50 is governed by switch control signals passed from a back-up module logic card 54 which in turn receives the power fault signals over lines 32 from the various primary module monitor cards.

Referring to FIG. 4, back-up module logic card 54 includes exclusive OR logic 60 which is connected to all of the incoming power fault lines 32. When a power fault signal appears on one, but only one, of the lines 32, a signal is sent over line 62 to trigger the appropriate one of the switches 52 to cause power supply 50 (FIG. 3) to be connected electrically in parallel with the single failing primary module. Line 62 is also connected to an indicator 64 which is set off to indicate to the operator that a single failure has occurred.

If multiple primary modules fail at one time, logic 60 issues a multiple failures signal to switch disable and alarm logic 66 which triggers an alarm to the operator and sends a signal on line 67 to cause all switches 52 to be disabled.

As long as no primary modules have failed, no signals are sent from logic 60.

Each output line from switches 52 is connected via a filtering capacitor 68 to ground in order to smooth out transients that occur as the back-up power supply 50 is switched into or out of the circuit.

If a failed power module returns to proper operating voltage, the power fault signal is removed from line 32 and logic 60 removes any triggering signal from line 62.

Each power fault line 32 is biased to a logical high value at the backup module card 54 via a bias resistor 70. The other end of each line 32 is connected to the primary module monitor card via a transistor 37 (FIG. 2) wired in an open collector configuration. As long as a primary module power supply has not failed, the open collector output of its monitor card keeps line 32 pulled to a logical low value. Upon failure, line 32 is allowed to go high, constituting a power failure signal, and remains high until the failure has been corrected. One advantage of this arrangement is that whenever a module is disconnected from AC power, for example when service is to be performed, line 32 automatically goes high, triggering the back-up module to be switched in to replace the disconnected module. When the disconnected module is reconnected, line 32 again goes low, automatically causing the back-up module to be switched out.

Referring again to FIG. 2, in the case when a primary module power supply has been shorted to ground in response to its output voltage rising above the high threshold, diodes 34, 36, 38 block current flow from the backup module to ground, electrically isolating the primary module from the load.

Other embodiments are within the following claims.

For example, there could be one or more additional backup power supplies, but fewer than the number of primary modules. In that case the backup module logic card could assign the backup supplies respectively to individual failed primary supplies.

I claim:

1. Apparatus for providing backup power to a plurality of primary power supplies each of which serves one of a plurality of loads, comprising
   at least one backup power supply, the number of said backup power supplies being fewer than the number of said primary power supplies,
   means for detecting failures of said primary power supplies and for generating power fault information indicative of the failure status of said primary power supplies, and
   means for connecting said backup power supply in parallel with one of said failed said primary power supplies to said load served by said one failed primary power supply without electrically disconnecting said one failed primary power supply from said load in response to said power fault information.

2. The apparatus of claim 1 wherein said means for detecting failures comprises
   a voltage detector connected to sense the voltage at an output of each said primary power supply,
   and means for comparing each said sensed voltage with a threshold and updating said power fault information based on the results of said comparisons.

3. The apparatus of claim 2 wherein said threshold comprises a voltage level lower than the normal output voltage of said primary power supply, and wherein said power fault information is updated when any said sensed voltage falls below said threshold.

4. The apparatus of claim 2 wherein said threshold comprises a voltage level higher than the normal output voltage of said primary power supply, and when said sensed voltage rises above said threshold, said means for detecting shunts said output to ground.

5. The apparatus of claim 1 wherein said means for detecting failures is connected to said means for connecting by a link that is biased to have one logical value when a primary power supply fails and is driven to a second logical value in the absence of a failure.

6. The apparatus of claim 5 wherein
   said means for detecting comprises a detector associated with each said primary power supply,
   said link comprises a plurality of logical signal lines each connected respectively between one said detector and said means for connecting, to carry a power fault signal when the associated primary power supply fails, and
   said means for connecting comprises logical circuitry responsive to said power fault signals for triggering an alarm if the number of said failed primary power supplies exceeds the number of said backup power supplies.

7. The apparatus of claim 5 wherein said link is driven to said second logical value by an open collector transistor.

8. The apparatus of claim 1 wherein each said primary power supply is connected by a power line to its load via an isolation diode, and said means for connecting attaches said backup power supply to said power line on the other side of said diode from said primary power supply, said diode being connected to block current flow toward said primary power supply.

9. The apparatus of claim 1 wherein there is only one said backup power supply.

10. The apparatus of claim 1 wherein each said load is a nest of circuit boards and each said power supply provides DC current to its associated nest.

* * * * *

UNITED STATES PATENT AND TRADEMARK OFFICE
CERTIFICATE OF CORRECTION

PATENT NO.   :   4,675,539

DATED        :   June 23, 1987

INVENTOR(S)  :   James Nichol

It is certified that error appears in the above-identified patent and that said Letters Patent is hereby corrected as shown below:

Col. 2, line 36, "($\pm$5, $\pm$12, and -12)" should be --(+5, +12, and -12)--.

Col. 2, line 55, "($\pm$5, $\pm$12, -12 volts)" should be --(+5, +12, -12 volts)--.

Signed and Sealed this

Twenty-eighth Day of November 1989

*Attest:*

JEFFREY M. SAMUELS

*Attesting Officer*     *Acting Commissioner of Patents and Trademarks*